April 2, 1946.　　　H. L. BENNETT　　　2,397,461
DYNAMOMETER ROLL SHIELDS
Original Filed Feb. 19, 1941　　2 Sheets-Sheet 1
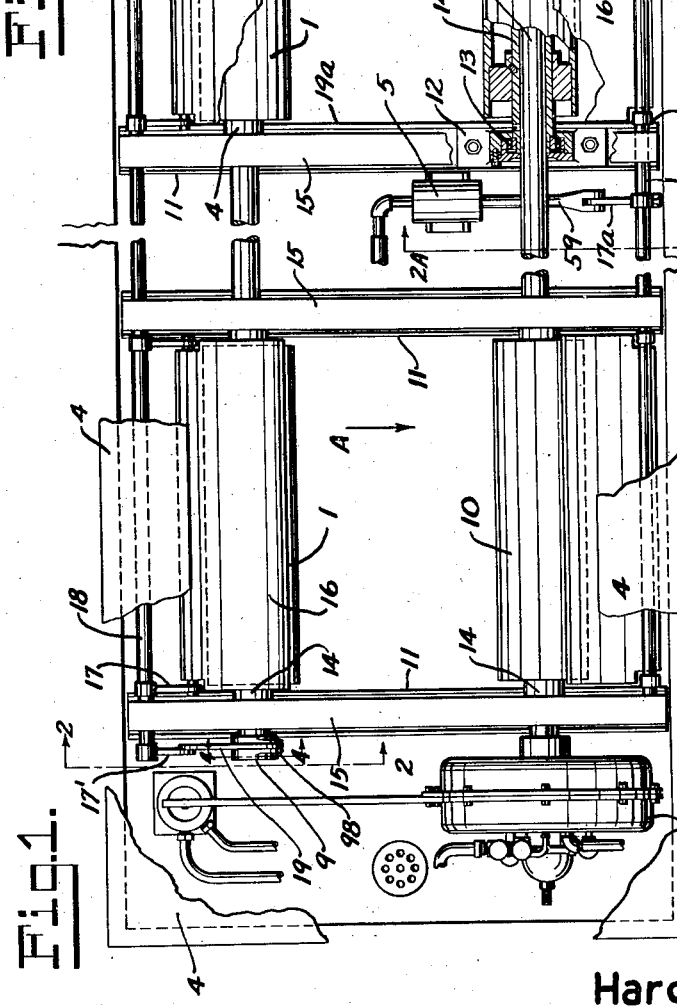
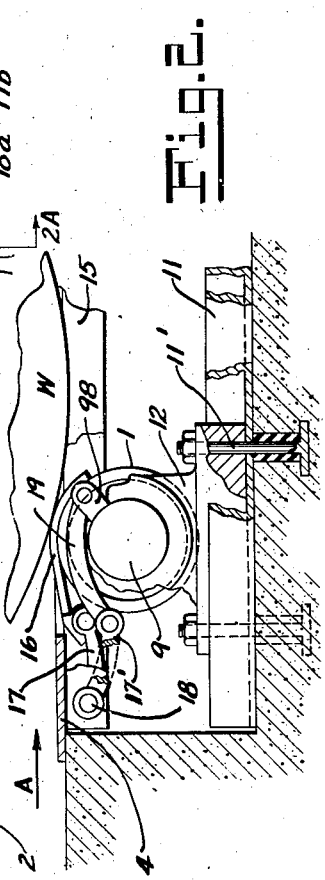
Inventor
Harold L. Bennett
By Reynolds & Beach
Attorneys April 2, 1946.  H. L. BENNETT  2,397,461
DYNAMOMETER ROLL SHIELDS
Original Filed Feb. 19, 1941    2 Sheets-Sheet 2
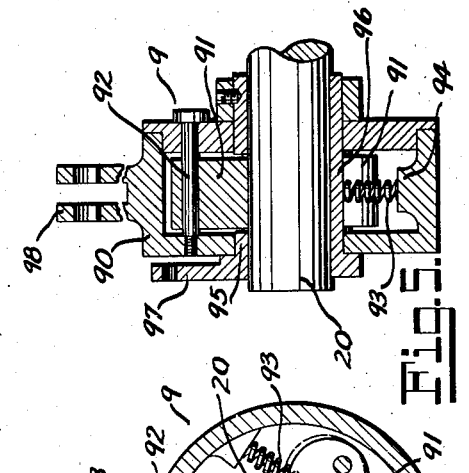
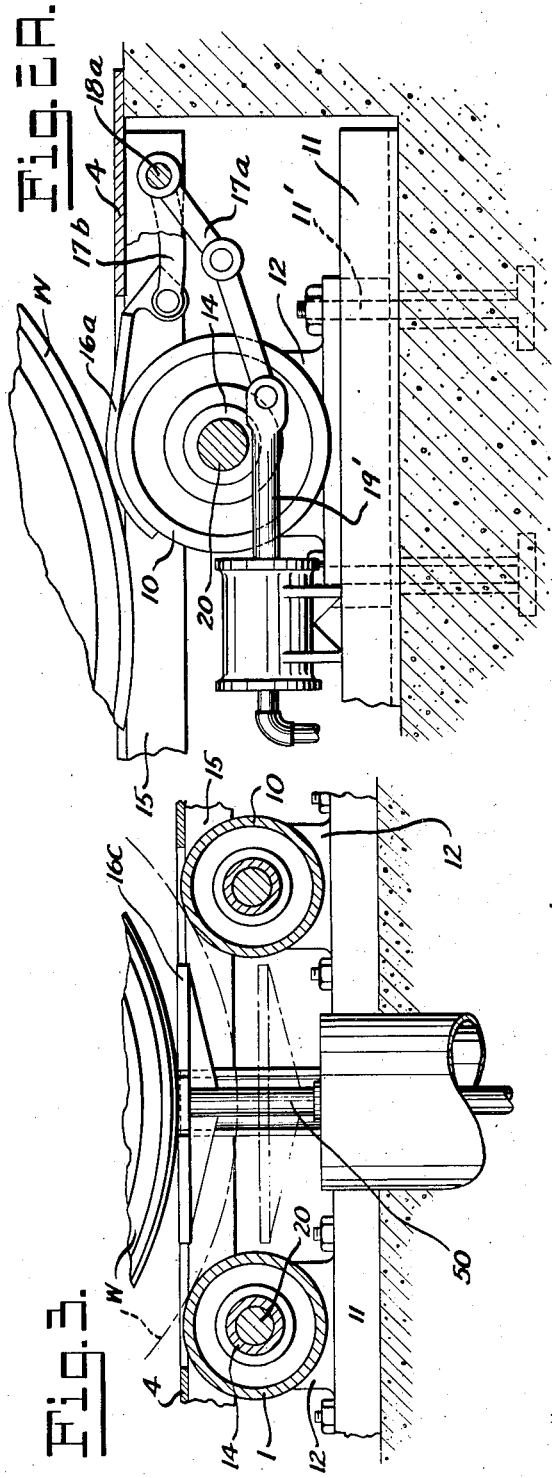
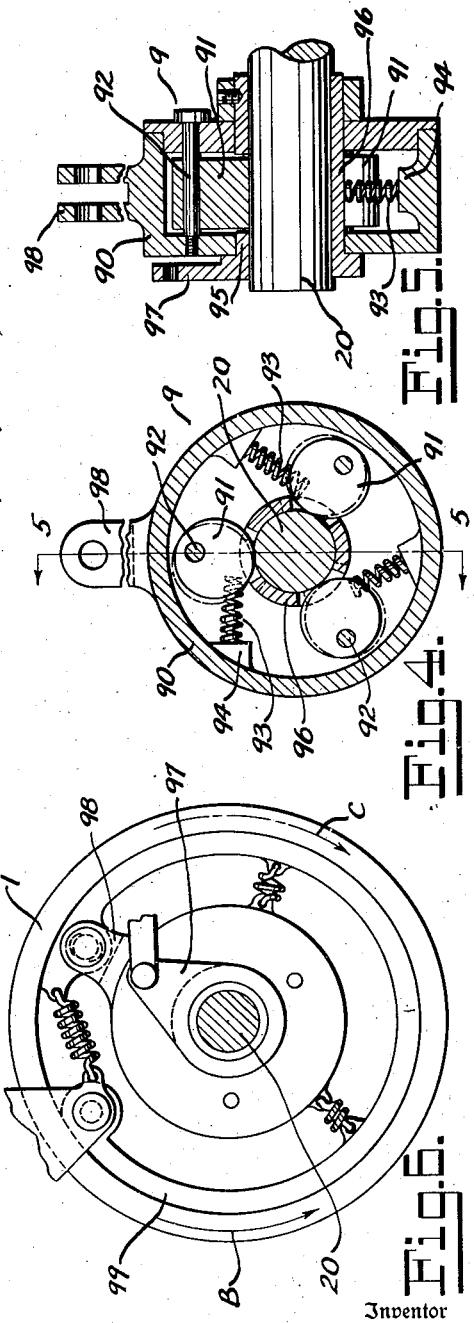
Inventor
Harold L. Bennett
By Reynolds & Beach
Attorneys Patented Apr. 2, 1946

2,397,461

UNITED STATES PATENT OFFICE 2,397,461

DYNAMOMETER ROLL SHIELDS

Harold L. Bennett, South Bend, Ind., assignor, by mesne assignments, to Bennett-Feragen, Inc., Seattle, Wash., a corporation of Washington Original application February 19, 1941, Serial No. 379,581. Divided and this application July 17, 1942, Serial No. 451,346

13 Claims. (Cl. 74—14)

This invention relates to a device for testing the power and allied characteristics of an automobile the automobile wheels whereof are cradled between pairs of rolls, and more particularly concerns the provisions for driving the automobile off such rolls, which in testing are rotated by the automobile wheels. The present invention is a division from my application Serial No. 379,581, filed February 19,1941.

In such devices the wheel-cradling rolls drive an absorption unit, usually a hydraulic absorption dynamometer, which is suitably connected to and associated with indicating mechanism to determine the power characteristics and related characteristics of the automobile engine. The driving wheels of the automobile must be so cradled in the driving rolls of the assembly that, regardless of the speed or power developed, the automobile wheels will not climb upon nor leave the rolls. However, when a test is completed it is desirable that the automobile be able to back off from the rolls, or in some instances to continue forwardly past the rolls, under its own power. It is desirable, in a preferred arrangement, that the movement of the automobile off the rolls be automatic to the extent that it is only necessary to reverse the direction of rotation of the wheels, and so that no attention on the part of the operator or attendant is required to permit the backing off of the automobile.

The attainment of the above ends in a simple, reliable manner, by mechanism readily associated with such a dynamometer, is the aim of the present invention.

In the accompanying drawings my invention has been shown in association with a typical dynamometer, and has been illustrated in various forms of execution.

Figure 1 is a plan view, showing parts broken away, of a typical dynamometer device with roll shields associated therewith such as are automatically brought into operative position by the action of backing off, and Figure 1A is a view similar to Figure 1, showing, however, power mechanism for effecting the movement into and from operative position of the roll shields.

Figure 2 is a transverse section taken substantially along the line 2—2 of Figure 1, and Figure 2A is a similar view on the line 2A—2A of Figure 1A.

Figure 3 is a section, generally similar to Figure 2, illustrating a different form of device for disengaging the automobile wheels from the dynamometer rolls.

Figure 4 is a detail section on the line 4—4 of Figure 1, showing the overrunning clutch mechanism, and Figure 5 is a further section through this device taken on the line 5—5 of Figure 4.

Figure 6 is an end view of a roll-braking device, serving as a substitute for the roll shield shifting device of Figure 4, for example.

The dynamometer 2 is driven from one of a pair of rolls, including a rear roll 1 and a front roll 10 of each pair, which are suitably spaced for cradling the driving wheels W of an automobile between them. Such a vehicle moves onto the rolls in the direction of the drive-on arrow A shown in Figures 1 and 2. Continued forward operation of the driving wheels, after they are cradled between the rolls 1 and 10, will produce a tendency for the wheels to climb up on the front roll 10, to which the dynamometer absorption unit 2 is connected. The rolls 1 rotate freely on their axes, anti-friction bearings 13 being used as required, so that in the highest degree possible the entire resistance to rotation of the vehicle wheels is created by governing the rotation of rolls 10.

The normal installation is of the pit type, and this type will be described, although the invention may be incorporated in a floor type, if desired. While various foundations for supporting the rolls and their bearings are possible, I have devised a very simple and effective mounting, consisting of four base channels 11 resting upon the floor of the pit, and each carrying two bearing supports or pillow blocks 12, which receive the anti-friction bearings 13, each bearing encircling an end of a hollow roll axle 14. The bearing supports, as shown best in Figures 2 and 2A, are received between the upturned flanges of the channels 11, and their upper sides may be connected together by channel (or preferably angle-iron) tie bars 15, each of which overlies a channel 11. On these tie bars floor plates 4 to cover the pit may be supported. Suitable tie members extending parallel to the rolls interconnect the several cross channels into a rigid base structure. Anchor bolts 11' hold the whole base structure accurately in place within the pit.

In the preferred form of the invention shield plates 16 are provided, which during a test are normally retracted from contact with the wheel W, so that they do not interfere between the rolls 10 and the wheels resting thereupon, but which are so arranged that automatically, upon the reversal of the direction of rotation of the wheels, these shields 16 are arranged to interpose themselves between the roll and the wheel, and thereby afford traction for the wheel to climb out upon. One edge of the shield preferably is curved to overlie and to rest upon a roll. Its other edge is pivotally supported upon arms 17, which are rigidly connected to a rotatable shaft 18, fixed in the frame 11. Although such curved plates are preferable, plane plates may be used.

The vehicle is driven upon the rolls under its own power, and until its driving wheels come to rest equally upon the rolls 1 and 10. If it should happen that the shield plates 16 for the rear rolls are in operative or roll-covering position, as they are shown in Figures 1 and 2, initial rotation of the vehicle wheels resting upon them, in the direction which would normally drive the vehicle forward, flings the plates backward into retracted position to uncover the rolls. Upon conclusion of the test, the vehicle normally backs off, under its own power. When the vehicle wheels are thus rotated in reverse, the rear rolls tend to revolve in a clockwise direction, as viewed in Figure 2, but because the shields do not contact these rolls, nor the wheels cradled thereupon, after being retracted, the shields can not be moved forward by traction between the wheels and shields, in the manner that they were retracted. Manual or power mechanism may be provided to move the shields again into operative position, and while such mechanism is shown in Figures 1A and 2A, for example, preferably the operation is automatic, and requires no action by the attendant, other than reversal of the direction of rotation of the automobile wheels.

To this end an automatic overrunning clutch 9 on roll shaft 14 is connected to an arm 17', rigidly mounted on shaft 18, by a link 19 connected to the arm 98 of the overrunning clutch mechanism. As long as the vehicle wheel turns in its forward driving direction the clutch does not engage, but as soon as the rotation is reversed it grips and swings arm 17' to turn the shaft 18 in the direction to move the shields 16 into or towards roll-covering position. When a shield or cover plate has been moved to a position above a roll, it may be tractively engaged by the wheel which rests upon that roll. The shield is then drawn by the wheel into the angle between the roll and the contacting vehicle wheel. As soon as the vehicle wheel grips the shield 16 instead of the roll 1 the shield shifts across and comes to rest upon the roll. The vehicle immediately begins to move backward over the cover plate and off the machine. The interengagement of the shield and the roll is sufficient to act as a stop for the shield, but additional stop means may readily be provided, if desired.

Normally it is not necessary to test a vehicle with its wheels rotating in the reverse direction, but when this is desirable suitable means may be provided to render the clutch 9 inoperative to rotate the shaft 18. Fingers 96, later described, furnish a means to this end. In this manner the shields 16 will not be moved into roll-covering position by the reverse rotation of the vehicle wheels.

The preferred type of overrunning clutch mechanism 9 is shown in Figures 4 and 5. It consists of a casing 90 which houses gripping cams or eccentrics 91, preferably in the form of circular disks, which are pivoted to the housing 90 at 92. Such pivots, as shown in Figure 4, are located near the peripheries of the respective eccentric members 91, and are secured in the housing at points spaced from the solid shaft 20, which is in effect a continuation or extension of the hollow roll shaft 14. The spacing of the pivots of these eccentric disks 91 from the shaft is such that the eccentrics may swing freely away from the shaft in the clockwise direction, but can not swing past the shaft in a counterclockwise direction. These eccentrics are urged into engagement with the roll shaft by springs 93 reacting from bosses 94 formed in the housing. For moving and retaining the eccentrics out of such engagement there may be provided a releasing sleeve 95, having fingers 96 interposed between the eccentrics. When the eccentrics are so held from engagement, reverse rotation of the roll will not advance the shield into operative position. A shifting lever or arm 97, which may be moved by any suitable mechanism, is attached to sleeve 95, as shown in Figure 5; see also Figure 6.

When the fingers 96 are in the position wherein they are shown in Figure 4, however, the springs 93 will hold the eccentrics in contact with the smooth periphery of shaft 20. As long as the shaft rotates counterclockwise the eccentrics will merely rub lightly, but engagement of the shaft with the eccentrics, by its initial rotation in reverse clockwise direction, will tend to swing them counterclockwise. Because, as stated, the spacing between pivot 92 and the shaft periphery is slightly less than sufficient to allow the eccentrics to move past the shaft its continued tendency to rotate clockwise will progressively increase the pressure of those eccentrics, reacting from their pivots 92, effecting a strong grip upon the shaft. Appreciable shaft rotation relative to the housing 90 in a clockwise direction will, therefore, be prevented, and this casing will tend to turn with the shaft.

An arm 98 projecting from the casing 90 is connected by the link 19, as shown, to shift the shield 16, or, alternatively, such arm may be anchored to hold the casing stationary or employed to actuate other mechanism. When connected to the cover plate operating mechanism it will be evident that slight rotation of shaft 20 in a clockwise direction, as viewed in Figure 4, will result in the plate being moved into operative roll-covering position in the manner illustrated in Figures 1 and 2. If, on the other hand, it is desired merely to hold the rolls from rotating without the provision of cover plates, one of the other arrangements mentioned may be used. If the arm 98 is merely anchored to hold casing 90 stationary, pressure of shaft 20, tending to rotate in a clockwise direction against the eccentrics 91, will result in these members gripping the shaft sufficiently tightly to hold it against further rotation in this direction. Since the roll is secured to such shaft it, in turn, will be locked. As soon as the shaft is rotated in the opposite or counterclockwise direction, however, the eccentrics 91 will immediately be released to permit such rotation.

As another alternative, instead of arm 98 being locked, it may, as shown in Figure 6, be connected to suitable operating mechanism of an internal expanding brake band 99, which may be located within the end of a roll 1, to engage the inner side of its shell. Normal forward rotation tends to drive the roll 1 counterclockwise as shown by the arrow B. When the direction of rotation of the wheel is reversed, tending to rotate the roll 1 in the direction shown by the arrow C, the tendency is immediately to tighten the band 99 into engagement with the roll. The particular construction of the internal brake mechanism is not part of my invention, and it may be conventional, provided it is capable of being operated by a lever such as 98.

In either of the arrangements described positive operating means or releasing means may be provided, and may be connected to a lever such as the arm 97.

Rotation of the vehicle wheels in a forward direction must not, of course, cause the shields 16 to be drawn over the rolls 10, for that would prohibit a normal test being made. If such an overrunning clutch is used for actuating these shields for drive-over exit of the vehicle from the testing machine, positive release mechanism must be used.

For example, as shown in Figures 1A and 2A, a power cylinder 5 connects by its piston rod 59, corresponding to the link 19, to the arm 17a upon the shaft 18a, and arms 17b, also on the shaft 18a, are connected to the shield 16a, which thus is moved positively and directly. There may be also a connection through the link 19a (see Figure 1A) to similar operating mechanism in conjunction with a shield 16b capable of overlying the roll 1.

As will now be clearly apparent, when the shields are in position over the rolls the shields will be gripped by the vehicle wheels as they rotate towards the shields (whether the vehicle wheels' rotation is forward or rearward is immaterial so long as their rotation is towards the shields, not away from them), the shields will be gripped by the vehicle wheels, affording secure traction for the vehicles to move off the machine. Without such shields it frequently happens that the rolls, which must be rotated for testing purposes, give insufficient traction for the vehicle to be driven from the machine, even though the rolls themselves are held, especially if the tire treads are wet and smooth. The shields 16 may be suitably roughened or corrugated to afford improved traction, if needed. If vehicles are always to be removed in the same direction over a certain set of rolls, whether forwardly or backwardly, the shields may be omitted from the other roll set, if desired.

In Figure 3 an alternative type of mechanism is shown for removing the vehicle from the machine. Instead of traction shields 16 being moved over the rolls, a plate 16c is supported between them for movement, as an elevator platform, from a retracted position below the periphery of the vehicle wheel cradled by the rolls up to a wheel-supporting position approximately level with or somewhat above the tops of the rolls. In rising to this position the wheel W will be lifted from its cradled position shown in broken lines into the full-line position, so that it need not climb the incline of the roll as the vehicle is moved from the testing machine. With the wheel thus elevated the power of the vehicle engine is not necessary to clear the machine. If, for example, the distributor head of the engine has been removed during the test, the vehicle may be pushed off the machine by an attendant. In this arrangement it is not necessary to lock the rolls, and if the vehicle is heavily loaded no particular strain is placed on its drive mechanism. Any suitable supporting and hoisting mechanism may be used for the plate 16c, and this is shown as an hydraulic or air cylinder and piston connected to the rod 50 which carries the plate 16c. A mechanical or electrical device may be used instead, however, and a screw may replace the reciprocating rod if desired.

What I claim as my invention is:

1. In combination with a pair of rotatable rolls spaced apart to cradle a driving wheel of an automotive vehicle, a wheel-supporting plate shiftable between an inoperative position, wherein it is out of contact with the wheel cradled by said rolls, and an operative position, wherein it is supportingly engaged beneath the wheel, and by shifting into such operative position relieving the wheel from contact with at least one roll to afford traction for driving off the rolls, and means guiding the wheel-supporting plate for movement between such inoperative and operative positions.

2. In combination with a pair of rotatable rolls spaced apart to cradle a driving wheel of an automotive vehicle, a traction plate disposed adjacent and cooperating with one of said rolls, the two being relatively displaceable for cradling the wheel between such rolls, drive means associated with one of said rolls, and operatively connected to said plate, to effect relative displacement of said plate and its cooperating roll to displace the wheel from that roll and to tractively support such wheel for driving off the rolls, and guiding means between the plate and the roll with which it is associated, for governing their relative displacement.

3. In a power testing device, rolls spaced apart to cradle a driving wheel of an automotive vehicle, a roll shield plate movable to cover the upper side of one of said rolls, means for supporting said shield plate in retracted position out of contact with such a roll, and actuating mechanism separate from such roll, inoperative to move said shield plate during rotation of its roll in a given direction, but driven in synchronism with said roll upon reverse rotation thereof to project said shield plate from such retracted position into contact with such roll and the wheel for disposition in such roll-covering position.

4. In a vehicle testing machine, in combination with a pair of rolls spaced apart to cradle a vehicle wheel therebetween, a shield supported and guided for movement into operative position wherein it is interposed between the vehicle wheel and one roll of said pair, and for movement from such operative position to an inoperative position, wherein the vehicle wheel may contact such roll and drive it by rotation in a given direction, and means separate from such rolls, connected to a portion of said shield, remote from the adjacent roll and driven in synchronism with such roll for moving said shield into engagement with such roll and into wheel-supporting contact with the wheel automatically upon reverse rotation of such roll.

5. In a vehicle testing machine, in combination with a pair of rotatable rolls spaced apart to cradle a driving wheel of an automotive vehicle, a wheel supporting member, means guiding said wheel supporting member for movement from an inoperative position, wherein it is out of contact with the wheel so cradled into an operative position, wherein the member may constitute the entire support for the wheel, and by such support affording traction for driving off the rolls, and means operable automatically by reversal of the normal sense of rotation of the wheel, and of a cradling roll, to shift the wheel-supporting member from inoperative into operative position.

6. In a vehicle testing machine, in combination with a pair of rolls spaced apart to cradle a vehicle wheel therebetween, a roll shield plate movable to cover the upper side of one of said rolls, a support, and an arm pivoted to said support and to said shield plate, swingable to guide said plate for movement between a retracted position out of contact with the vehicle wheel and an operative position overlying one roll of said pair and supportingly engaged beneath the wheel for driving thereover off the rolls.

7. In a vehicle testing machine, in combination with a pair of rolls spaced apart to cradle a vehicle wheel therebetween, a roll shield plate movable to cover the upper side of one of said rolls, a support, a shaft journaled in said support, means driving said shaft in synchronism with rotation of one roll of said pair, and a pivoted arm operatively connected to said shaft and to said shield plate, swingable by rotation of said shaft in a sense the reverse of the shaft's sense of rotation during a testing operation, to move said plate from a retracted position wherein it is out of contact with said rolls and the wheel, to an operative position wherein it overlies one roll of said pair and is supportingly engaged beneath the wheel, for driving thereover off the rolls.

8. In a vehicle testing machine, in combination with a pair of rotatable rolls spaced apart to cradle a driving wheel of an automotive vehicle, a wheel supporting plate member, and means guiding said wheel supporting plate member for movement from an inoperative position, wherein it is out of contact with the wheel so cradled, into an operative position, wherein the member may constitute the entire support for the wheel, and by such support affording traction for driving off the rolls.

9. In a vehicle testing machine, in combination with a pair of rolls spaced apart to cradle a vehicle wheel therebetween, and a roll shaft rotating with one of said rolls, a roll shield plate movable to cover the upper side of one of said rolls, a support, a rock shaft journaled in said support, a rock shaft rotating member operatively connected to turn said rock shaft, a plurality of disks disposed in spaced relationship circumferentially about said roll shaft and pivoted eccentrically on said rock shaft rotating member in position for engaging the roll shaft simultaneously, said roll shaft, by rotation in a given direction, swinging said eccentric disks simultaneously away from it, and by its initial rotation in the reverse direction slightly swinging said eccentric disks in the opposite direction and pressing against the disks, and through them exerting force upon their pivots to turn said rock shaft rotating member, and an arm pivoted to said rock shaft and to said shield plate, movable by rotation of said shaft to shift said plate from a retracted position out of contact with said rolls and the wheel cradled thereby into an operative position overlying one roll of said pair and supportingly engaged beneath the wheel for driving thereover off the rolls.

10. In a power testing device or the like, including rolls spaced apart to cradle a driving wheel of an automobile, a traction member engageable by such wheel to enable the automobile to be driven off said rolls, and normally retracted from wheel-engaging position during testing operations, and means automatically operable by reverse movement of such wheel to effect movement of said traction member into wheel-engaging position.

11. In a vehicle testing machine, in combination with a pair of rolls spaced apart to cradle a vehicle drive wheel therebetween, a roll shield guided for movement between an operative position, wherein it overlies one of said rolls and tractively engages beneath the wheel, and a retracted position wherein it is out of contact with the wheel, and means guiding said shield for movement into such operative position, for driving off said rolls.

12. In a vehicle testing machine, in combination with a pair of rolls spaced apart to cradle a vehicle drive wheel therebetween, a roll shield guided for movement between an operative position, wherein it overlies one of said rolls and tractively engages beneath the wheel, and a retracted position wherein it is out of contact with the wheel, and means automatically operable upon reverse rotation of the rolls to move said shield into such operative position, for driving off said rolls.

13. In a vehicle testing machine, in combination with a pair of rolls spaced apart to cradle a vehicle drive wheel therebetween, a roll shield guided for movement between an operative position, wherein it overlies one of said rolls and tractively engages beneath the wheel, and a retracted position wherein it is out of contact with the wheel, and an operative connection between said shield and one of said rolls, including an overrunning clutch associated with said roll, to move said shield automatically into such operative position upon rotation of the rolls in reverse to their sense of rotation during a testing operation, but by the rolls' rotation during such testing operation to leave the shield free, for retraction.

H. L. BENNETT.